United States Patent
Tang et al.

(10) Patent No.: US 7,080,169 B2
(45) Date of Patent: Jul. 18, 2006

(54) RECEIVING DATA FROM INTERLEAVED MULTIPLE CONCURRENT TRANSACTIONS IN A FIFO MEMORY HAVING PROGRAMMABLE BUFFER ZONES

(75) Inventors: John Tang, Laguna Niguel, CA (US); Jean Xue, Irvine, CA (US); Karl M. Henson, Rancho Santa Margarita, CA (US)

(73) Assignee: Emulex Design & Manufacturing Corporation, Costa Mesa, CA (US)

( * ) Notice: Subject to any disclaimer, the term of this patent is extended or adjusted under 35 U.S.C. 154(b) by 270 days.

(21) Appl. No.: 10/120,733

(22) Filed: Apr. 10, 2002

(65) Prior Publication Data

US 2003/0110364 A1    Jun. 12, 2003

Related U.S. Application Data

(60) Provisional application No. 60/339,643, filed on Dec. 11, 2001.

(51) Int. Cl.
*G06F 3/00* (2006.01)
*G06F 13/00* (2006.01)

(52) U.S. Cl. .............. 710/52; 710/31; 710/33; 710/34; 710/36; 710/57; 711/100; 711/112; 711/117; 711/168; 714/25; 714/139; 348/390.1; 348/505

(58) Field of Classification Search ............ 710/31, 710/33, 34, 36, 52, 57; 711/100, 112, 171, 711/117, 168; 714/25, 139; 348/505, 309.1
See application file for complete search history.

(56) References Cited

U.S. PATENT DOCUMENTS

| | | | | |
|---|---|---|---|---|
| 4,703,340 A | * | 10/1987 | Balaban et al. .......... 348/505 |
| 5,121,479 A | * | 6/1992 | O'Brien .................. 710/34 |
| 5,450,546 A | * | 9/1995 | Krakirian ................. 710/57 |
| 5,504,899 A | | 4/1996 | Raz |
| 5,513,126 A | | 4/1996 | Harkins et al. |
| 5,561,823 A | * | 10/1996 | Anderson ................ 710/52 |
| 5,564,026 A | * | 10/1996 | Amini et al. ............ 710/315 |
| 5,675,383 A | * | 10/1997 | Yagasaki et al. ........ 348/390.1 |
| 5,761,444 A | | 6/1998 | Ajanovic et al. |
| 5,870,567 A | | 2/1999 | Hausauer et al. |
| 5,975,383 A | * | 11/1999 | Cavender et al. ......... 223/46 |
| 6,029,226 A | * | 2/2000 | Ellis et al. .............. 711/100 |
| 6,044,368 A | | 3/2000 | Powers |
| 6,101,575 A | * | 8/2000 | Simms et al. ........... 711/117 |
| 6,263,410 B1 | | 7/2001 | Kao et al. |
| 6,360,300 B1 | * | 3/2002 | Corcoran et al. ......... 711/139 |
| 6,397,287 B1 | * | 5/2002 | Brown et al. ........... 710/305 |

(Continued)

OTHER PUBLICATIONS

"SANPower I Solutions," www.bellmicro.com/SANPower/sanpowerI/product_showcase.htm, Feb. 25, 2002.

(Continued)

*Primary Examiner*—Tammara Peyton
(74) *Attorney, Agent, or Firm*—Morrison & Foerster LLP

(57) ABSTRACT

A FIFO memory receives data transfer requests before data is stored in the FIFO memory. Multiple concurrent data transfers, delivered to the FIFO memory as interleaved multiple concurrent transactions, can be accommodated by the FIFO memory (i.e., multiplexing between different sources that transmit in distributed bursts). The transfer length requirements associated with the ongoing data transfers are tracked, along with the total available space in the FIFO memory. A programmable buffer zone also can be included in the FIFO memory for additional overflow protection and/or to enable dynamic sizing of FIFO depth.

22 Claims, 6 Drawing Sheets

U.S. PATENT DOCUMENTS 6,470,463 B1 * 10/2002 Chen et al. .................... 714/25
6,622,206 B1 * 9/2003 Kanamaru et al. ........... 711/113
6,690,523 B1 * 2/2004 Nguyen et al. ................ 360/31

OTHER PUBLICATIONS

"The Critical Role of a Host Bus Adaptor (HBA in Storage Area Networks," Emulex Technology Brief, Apr., 2001.

"Storage Area Networking with Fibre Channel," www.emulex.com/products/white/fc/san.html, Feb. 25, 2002.

"Single Server Storage Configuration," www.emulex.com/intel/l_ibod.html, Feb. 25, 2002.

Ajay V. Bhatt, "Creating a Third Generation I/O Interconnect".

"How IDE Controllers Work," www.howstuffworks.com/ide2.htm, Apr. 10, 2002.

"Comparative I/O Positioning," Mellanox Technologies, www.mellanox.com/products.

"iSCSI Storage over IP," IBM.com/storage.

"How PCI Works," www.howstuffworks.com/pci1.htm, Apr. 10, 2002.

"PCI-X Addendum to the PCI Local Bus Specification," PCI Special Interest Group, Jul. 24, 2000.

Emulex Product Reference Guide, Jun. 2002, Costa Mesa, CA.

Emulex Web Page: "GN9000/V 1 Gb/s VI/IP © PCI Host Bus Adapter" Features and Description, 2001.

Emulex Web Page: Press Release—"Emulex HBA Selected by Network Appliance For First DAFS-Based Database Storage Solution," Apr. 3, 2002, Costa Mesa, CA.

* cited by examiner

RECEIVING DATA FROM INTERLEAVED MULTIPLE CONCURRENT TRANSACTIONS IN A FIFO MEMORY HAVING PROGRAMMABLE BUFFER ZONES

CROSS REFERENCE TO RELATED APPLICATIONS

This application claims the benefit of the priority of U.S. Provisional Application Ser. No. 60/339,643, filed Dec. 11, 2001 and entitled "PCI/X TRANSMIT FIFO".

BACKGROUND

The present application describes systems and techniques relating to first in first out (FIFO) memory design, for example, a FIFO designed to receive data over a bus from interleaved multiple concurrent transactions.

In the field of FIFO memory design, addressing the potential for FIFO overflow and the resulting loss of data is a significant design consideration. One traditional approach is to design the system and/or device in which the FIFO memory is to be placed such that data will always be read out of the FIFO memory faster than the data is written into the FIFO memory.

Other conventional approaches include adding circuitry to the FIFO memory to output information relating to the current state of the FIFO memory. This information can then be used by external components in orchestrating data writing and reading, into and out of the FIFO memory. Typical examples of such FIFO state outputs include a full flag, an empty flag, an almost full flag and an almost empty flag. Additionally, some FIFO memories include circuitry that makes the almost full flag and/or the almost empty flag programmable.

SUMMARY

The present application teaches a FIFO memory with overflow protection. According to an aspect, a FIFO memory receives data transfer requests before data is stored in the FIFO memory. Data transfer requests specify sizes of the data transfer to be initiated, to enable determination of whether the FIFO memory has enough space to accommodate the data. Once a data transfer is initiated, the space in the FIFO memory for that transfer can already be reserved by the transfer request. Data can be asynchronously written into and read out of the FIFO memory.

Multiple concurrent data transfers, delivered to the FIFO memory as interleaved multiple concurrent transactions, can be accommodated by the FIFO memory (i.e., multiplexing between different sources that transmit in distributed bursts). The transfer length requirements associated with the ongoing data transfers are tracked, along with the total available space in the FIFO memory. A programmable buffer zone also can be included in the FIFO memory for additional overflow protection and/or to enable dynamic sizing of FIFO depth.

One or more of the following advantages may be provided. The systems and techniques described may allow the use of a single FIFO memory to receive data from interleaved multiple concurrent transactions for multiple data transfers, providing an effectively larger memory depth than possible with separate FIFO memories, while still preventing FIFO overflow. Additionally, the systems and techniques described may result in the ability to dynamically size FIFO depth, making the FIFO memory shareable, and a FIFO that can be tuned for various combinations of write and read rates.

Details of one or more implementations are set forth in the accompanying drawings and the description below. Other features and advantages may be apparent from the description and drawings, and from the claims.

DRAWING DESCRIPTIONS

These and other aspects will now be described in detail with reference to the following drawings.

Like reference symbols in the various drawings indicate like elements.

DETAILED DESCRIPTION

The systems and techniques described here relate to a FIFO memory receiving data from interleaved multiple concurrent transactions. The description that follows frequently discusses FIFO memory in the context of receiving data over a PCI-X (Peripheral Component Interconnect Extended) bus, but can be applied in other contexts.

Figures 1, 2:
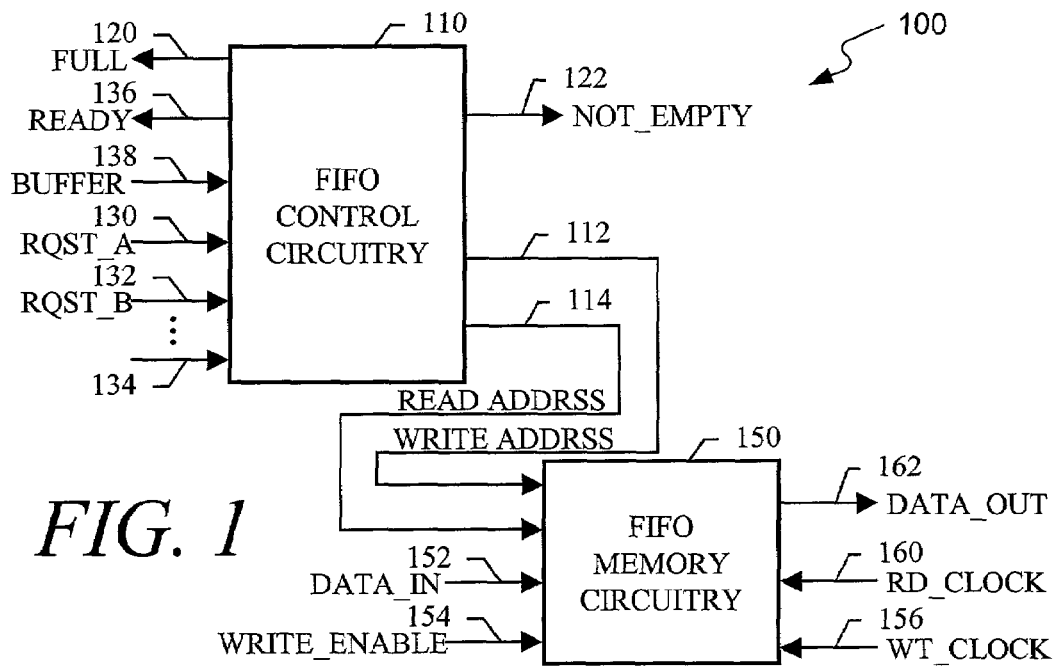
FIG. 1 is a block diagram illustrating a FIFO memory that receives transfer length requests for multiple data transfers and authorizes data transfers.
FIG. 2 is a block diagram illustrating a memory circuitry configuration that can be used in the FIFO memory of FIG. 1.

FIG. 1 is a block diagram illustrating a FIFO memory 100 that receives transfer length requests for multiple data transfers and authorizes data transfers. The FIFO memory 100 includes FIFO control circuitry 110 and FIFO memory circuitry 150. The FIFO control circuitry 110 includes addressing logic enabling asynchronous read and write operations on the FIFO memory circuitry 150.

The addressing logic provides a write address 112 and a read address 114 to the FIFO memory circuitry 150. In addition, the FIFO control circuitry 110 includes difference circuitry to track available space in the memory circuitry 150. This difference circuitry can include a storage location, such as a register, that holds a value indicating either the available space or the used space in the FIFO memory circuitry 150. The difference circuitry can also include logic for generating and outputting a full flag on an output line 120 and a not_empty flag on an output line 122.

The FIFO memory 100 can accept data from interleaved multiple concurrent transactions. These transactions correspond to multiple specific data transfers, which may occur at different data rates. The transactions can be interleaved with respect to their corresponding data transfers, such as by sending a first transaction corresponding to a data transfer A, a second transaction corresponding to a second data transfer, a third transaction corresponding to the first data transfer, and a fourth transaction corresponding to the second data transfer. For example, in PCI-X, multiple data transfers, known as sequences, can be initiated and received over a bus concurrently. A sequence in PCI-X is one or more data transactions associated with carrying out a single logical transfer by a requester, and these transactions can be programmed to run at 33, 66, 100, or 133 Mhz (Megahertz). Thus a request for one thousand bytes of data can be delivered all at once, or as small bursts of varying size at varying times.

The FIFO memory 100 can accept data from these types of interleaved multiple concurrent transactions, while preventing FIFO overflow. The FIFO control circuitry 110 includes two or more transfer length input lines 130, 132, 134. These transfer length input lines allow a reservation of FIFO space for an entire data transfer before the data transfer is initiated. A ready output line 136 can be asserted when the sum of memory space requests does not exceed the available space in the FIFO memory 100.

For example, a request line A 130 can receive a request for a 1000 byte data transfer. This request A can be stored in the FIFO control circuitry 110, and the difference circuitry compares this request to the currently available space and any previously reserved space. If the transfer data amount (1000 bytes) plus any previously reserved data amount is less than or equal to the available FIFO space, the request is authorized and the ready output line is asserted, thereby allowing initiation of the data transfer.

As data corresponding to request A is written into the FIFO memory circuitry 150, the stored transfer data amount for request A is decremented, indicating a reduction in the amount of space reserved in the FIFO memory 100. When a second transfer request is received on a request line B 132, the difference circuitry performs the same logical operations, where the stored transfer data amount for request A is part of the previously reserved data amount used in the comparison.

Thus, for read and write cycles, the FIFO control circuitry 110 keeps track of the available space in the FIFO memory circuitry 150 and the transfer length requirements associated with on-going data transfers. Additionally, more than two request lines can be implemented, enabling more than two on-going data transfers with the corresponding multiple concurrent transactions.

The FIFO control circuitry 110 may be programmable. In one implementation, the FIFO control circuitry 110 can be programmed to respond to requesters based on a strict first-come-first-serve rule, or the FIFO control circuitry 110 can be programmed to use a modified first-come-first-serve rule where the first requester that does not exceed the current available space is the first served. Requesters that are skipped can be kept track of in a register block, which may be either internal or external to the FIFO memory 100.

The FIFO memory 100 may include controls for big-endian/little-endian and byte-lane swapping. The FIFO memory 100 may include test features to inject parity errors and force a FIFO overflow condition. The FIFO memory 100 may include data compression/decompression logic on its input and output respectively to provide additional overflow protection.

The FIFO memory 100 enables overflow prevention by accepting data transfer requests for FIFO resources and then outputting a ready flag to indicate whether the data transfer should be initiated. This can be useful when receiving data over a bus in which data is delivered in interleaved multiple concurrent transactions. For example, in PCI-X, data from multiple concurrent transactions can be written into a FIFO memory in burst mode, where no wait state insertion may be allowed, and where the exact length of any one transfer may be unknown. In this type of situation, multiple transactions with large amounts of data can arrive in rapid succession. This can cause FIFO overflow, unless these multi-transaction burst cycles are accommodated. The ready output line 136 enables just-long-enough hold-off on data transfer requests during asynchronous read and writes into the FIFO memory 100.

The FIFO control circuitry 110 also can include a buffer input line 138 used to receive a programmable buffer zone size. The programmable buffer zone size specifies an amount of the FIFO memory 100 that is set aside. The buffer zone size can be stored in a register set in the FIFO memory 100. The buffer zone size can be included in the logical operations performed by the difference circuitry to generate the ready output, and can be included as part of the previously reserved amount or as unavailable space, depending on whether the buffer zone should be reflected in the full and not_empty outputs.

The buffer zone size can be programmed to a positive or negative value. A positive buffer zone size can be used to provide additional overflow prevention. This can be useful when the transfer data amounts received on the request lines do not exactly correspond to the amount of data that will be stored in the FIFO memory. For example, tags identifying which transaction particular data belongs to can be stored in data locations in the FIFO memory, as will be discussed further below.

The buffer zone size can be programmed to a negative value to allow greater amounts of data to be written into the FIFO memory 100. A negative buffer zone causes the FIFO memory 100 to report more available space in the FIFO memory circuitry than is actually available. Thus, the FIFO memory 100 can be programmed to accommodate larger and more data transfers without actually expanding the FIFO memory capacity.

The buffer zone size can be stored in a register set that is accessible to external firmware. The bit patterns of this register set can be programmed to enable a large variation in buffer zone size (i.e., an eight bit register is not limited to representing a fixed set of two hundred and fifty six ($2^8$) values). Reads from the FIFO memory 100 can be made to run at various clock frequencies. Thus in some implementations the difference in read and write speeds can be used to protect against FIFO overflow. In such cases, a negative buffer zone can be programmed to logically increase FIFO depth while still having an enforced upper limit, thus allowing FIFO memory sharing with simultaneous control over overflow protection.

The FIFO memory circuitry 150 can be implemented using a dual port random access memory (RAM) or a register file. The FIFO memory circuitry 150 includes a data input line 152, a write enable input line 154, and a write clock input 156. The FIFO memory circuitry 150 also includes read clock input 160 and a data output line 162. The FIFO memory circuitry 150 can include storage locations for control bits and data bits.

Moreover, the inputs and outputs of the FIFO memory 100 can be serial and/or parallel inputs/outputs. For example, the buffer input line 138 can be an eight bit parallel input, and each of the transfer length input lines 130, 132, 134 can be a serial input line.

FIG. 2 is a block diagram illustrating a memory circuitry configuration that can be used in the FIFO memory of FIG. 1. A dual port RAM 200 includes control bits 210 and data bits 250. The control bits 210 can be used to store tags identifying data transfers to which data stored in the data bits 250 corresponds (e.g., 5 bit PCI-X tags).

Alternatively, the control bits 210 can be used to identify data bits 250 that are used to store tags. For example, control bits 212 indicate that data bits 252 contain a data tag. In this fashion, data for different transfers can be stored in the memory as they are received, and large tag values (e.g., 24 bit tags) can be stored without requiring a large number of control bits. For example, control bits 212 identify the beginning of data for a transaction, and data bits 252 identify this transaction as belonging to data transfer A. Control bits 214 identify the end of this data transaction. Control bits 216 identify the beginning of data for another transaction, and data bits 256 identify this transaction as belonging to data transfer B. Control bits 218 identify the beginning of data for yet another transaction, and data bits 258 identify this transaction as belonging to data transfer A.

When data tags are stored in the FIFO memory in this fashion, a positive buffer zone size can be used to prevent FIFO overflow. For example, in PCI-X, each transaction includes a tag that identifies the sequence to which the transaction belongs. A single sequence can be made up of one transaction or multiple transactions. A positive buffer zone creates room to account for storage of the variable number of tags associated with each sequence.

The dual port RAM 200 can be 1280×80. The control bits 210 can be sixteen bits wide and the data bits 250 can be sixty-four bits wide. The control bits can include parity bits (e.g., eight parity bits, one for each byte of data), valid bits (e.g., three valid bits specifying which bytes of data are valid), and delimiter bits (e.g., four delimiter bits specifying whether the data bits contain a tag, data or the last word of data in a block, as well as possibly other information). The control bits also can include an overflow status bit, which is set when writing data with the full flag set. In this situation, error recovery can be triggered, and the overflow status bits can be used during error recovery.

Figure 3A:
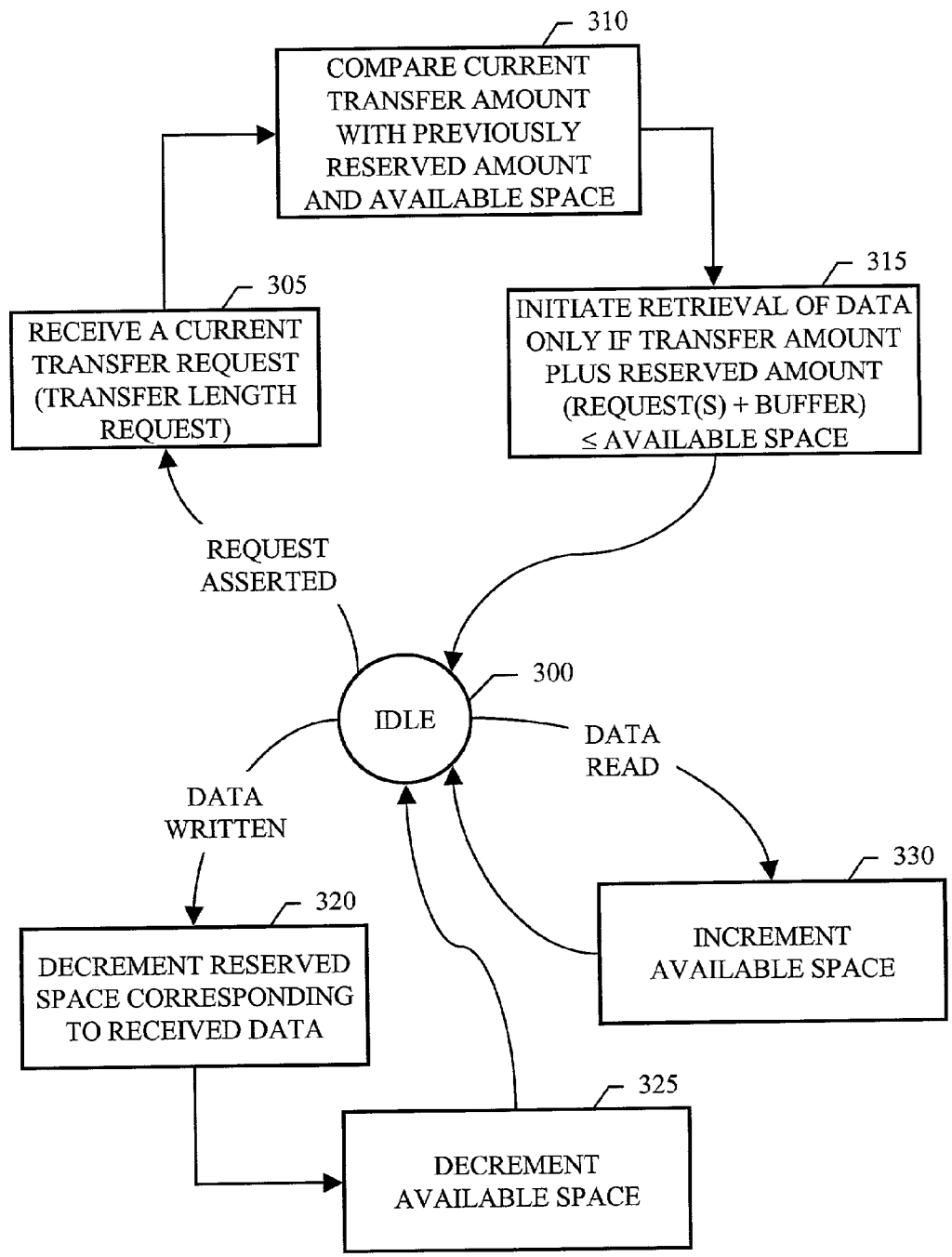
FIG. 3A is a combined flowchart and state diagram illustrating operations performed in a FIFO memory that receives transfer length requests for multiple data transfers and authorizes data transfers.

FIG. 3A is a combined flowchart and state diagram illustrating operations performed in a FIFO memory that receives transfer length requests for multiple data transfers and authorizes data transfers. The FIFO memory has an idle state 300. From this state 300, when a request is asserted on a transfer length input line, a current transfer request is received at 305. The current transfer request indicates a data transfer length request. For example, a value indicating a requested transfer length can be latched into the FIFO memory.

Then, the current transfer amount in the request is compared with a previously reserved amount of FIFO space at 310. As discussed above, the previously reserved amount can include both reserve amounts for one or more existing data transfers and an amount specified for a buffer zone. Next, retrieval of data for the current request is initiated, such as by asserting a ready flag, only if the transfer amount plus the reserved amount (approved transfer request(s) plus any buffer space (positive or negative)) is less than or equal to the space available in the FIFO memory.

As data is written into the FIFO memory, reserved FIFO space corresponding to the received data is decremented at 320. For example, the latched-in transfer length value corresponding to the data being written into the FIFO memory is decremented in its storage location in the FIFO memory. Also as data is written into the FIFO memory, the available FIFO space is decremented at 325. As data is read from the FIFO memory, the available FIFO space is incremented at 330.

Figure 3B:
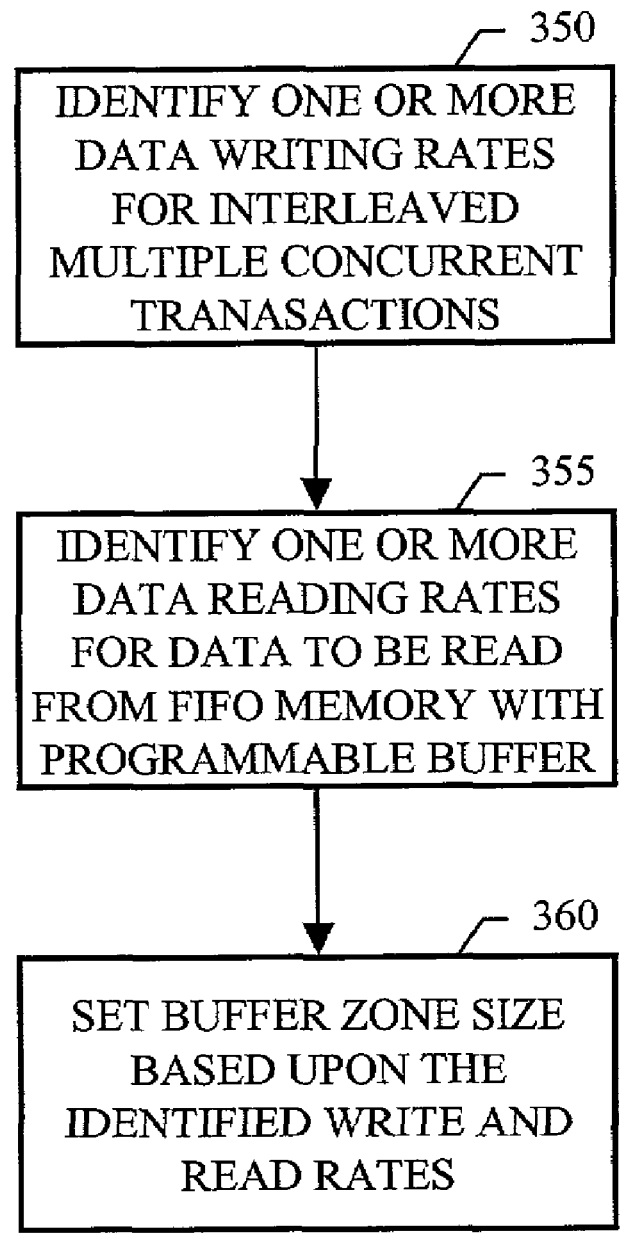
FIG. 3B is a flowchart illustrating configuring a FIFO memory having a programmable buffer zone.

FIG. 3B is a flowchart illustrating configuring a FIFO memory having a programmable buffer zone. One or more data writing rates for interleaved multiple concurrent transactions are identified at 350. This can involve accessing a defined location where such data is stored, requesting such data, and/or receiving such data from another source. For example, in PCI-X, the possible data writing rates are defined by the PCI-X standard. These writing rates, or a subset of these rates, can be stored in firmware and/or software.

Next, one or more data reading rates are identified for data to be read from a FIFO memory having a programmable buffer zone at 355. The FIFO memory can be part of a system that includes a clock domain that can be made to run at various clock frequencies. In addition, the FIFO memory can be read by multiple processors.

Finally, based on the identified one or more data writing rates and the one or more data reading rates, the buffer zone size is set at 360. This process allows dynamic sizing of FIFO depth and makes the FIFO memory shareable. Because the FIFO memory's programmable buffer zone can be specified as either a positive or a negative value, the FIFO memory can effectively be tuned to work in various combinations of different read and write data rates.

Figure 4A:
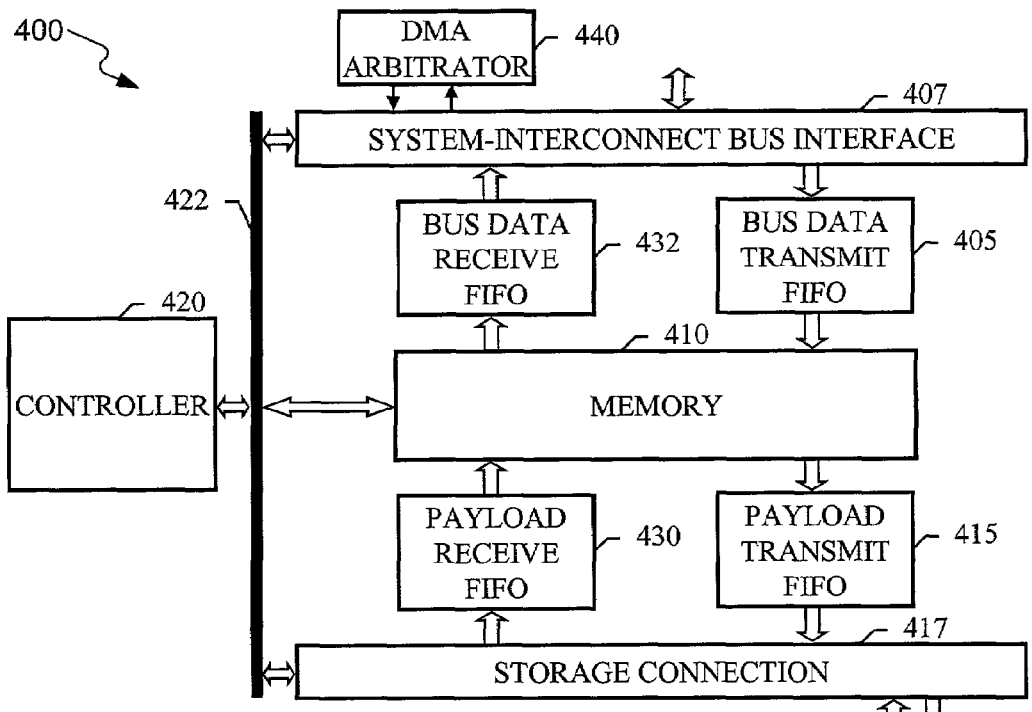
FIG. 4A is a block diagram illustrating a bus adapter.

FIG. 4A is a block diagram illustrating a bus adapter 400. The bus adapter provides an interface between a system-interconnect bus and storage using a system-interconnect bus interface 407 and a storage connection 417. The bus adapter 400 can be used to connect a computing system, such as a network server, to a storage area network, as will be discussed further below. The bus adapter 400 includes a bus data transmit FIFO 405, which includes the functionality described above. Thus, the system-interconnect bus can be a PCI-X bus that provides data transfers using interleaved multiple concurrent transactions.

The bus adapter 400 can include management circuitry (not shown), including a transmit processor, coupled with the bus data transmit FIFO 405. This management circuitry can coordinate the activities of the bus data transmit FIFO 405, providing an interface between the bus data transmit FIFO 405 and the rest of the bus adapter 400, allowing transfer of data from the system-interconnect bus interface 407 to other logic blocks that act on the data. For example, the transmit processor can be used to latch-in instructions to the bus data transmit FIFO 405, identifying to the bus data transmit FIFO 405 the length of data to obtain using the system-interconnect bus, a source memory address, and a destination address in a local memory 410. This management circuitry functionality also can be integrated into the FIFO 405.

When the bus data transmit FIFO 405 determines that it has enough space to handle a data transfer request, the bus data transmit FIFO 405 requests the data transfer from a DMA (Direct Memory Access) arbitrator 440, which controls access to the system-interconnect bus interface 407. When the DMA arbitrator 440 provides the system-interconnect bus interface 407 to the FIFO 405, data is written into the FIFO 405.

Data is read out of the FIFO 405 and into the memory 410. From the memory 410, data is written into a payload transmit FIFO 415, and then read out of the FIFO 415 onto the storage connection 417 (e.g., as data packets sent using a network interface). The storage connection 417 can be part of a network interface connecting to a storage area network, such as a Fibre Channel storage area network.

Data can in turn be received over the storage connection 417 into a payload receive FIFO 430 and transferred to the memory 410. This data can then be written into a bus data receive FIFO 432 and read out of the FIFO 432 onto the system-interconnect bus interface 407.

The bus adapter 400 can be formed on a semiconductor substrate as an integrated circuit and can include various other components, such as a controller 420 for coordinating and orchestrating the activity of the bus adapter 400 and a register bus 422. Additionally, the bus adapter 400 can be part of a larger system.

Figure 4B:
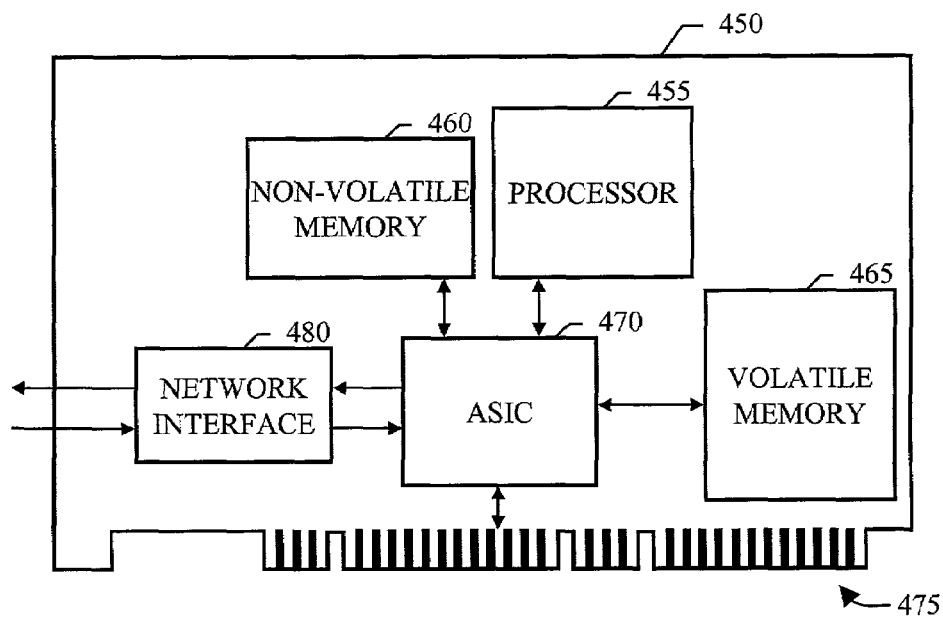
FIG. 4B is a block diagram illustrating a host bus adapter card according to one implementation.

FIG. 4B is a block diagram illustrating a host bus adapter card 450 according to one implementation. The host bus adapter card 450 is configured to be inserted into an existing computing system to provide an interface to a storage area network, providing block-level Input/Output (I/O) services. The host bus adapter 450 includes a processor 455, which can be an SA-110 StrongARM processor, provided by Intel Corporation, located at 2200 Mission College Boulevard Santa Clara Calif. 95052-8119.

The host bus adapter 450 also includes a nonvolatile memory 460 and a volatile memory 465. These memories can be used to store instructions for implementing the method described above. The non-volatile memory 460 can be a flash memory. The volatile memory 465 can be a high-speed SRAM (Static Random Access Memory)-based memory device, such as a QDR (Quad Data Rate) SRAM with a dedicated read port and a dedicated write port. The volatile memory 465 can be used to store transmit and receive payload data as well as to store network and bus context information and processor data (e.g., code, stack and scratch data).

The host bus adapter 450 also includes a bus adapter application specific integrated circuit (ASIC) 470. This bus adapter ASIC 470 connects the processor 455, the non-volatile memory 460 and the volatile memory 465 with a bus interface 475 and a network interface 480. The bus adapter ASIC 470 can be implemented using various circuitry components, including those shown and described in connection with FIG. 4A above, and can be made to emulate the designs of multiple manufactures to improve interoperability with various components to be connected to the host bus adapter 450.

The bus interface 475 can be configured to connect with a PCI-X bus. The network interface 480 can be configured to connect with a Fibre Channel network.

The bus adapters shown and described above in connection with FIGS. 4A and 4B are presented as embodiments. Other bus adapters, as well as entirely different devices, can use the systems and techniques described here. In general, a bus adapter provides I/O processing and physical connectivity between a data processing system, such as a server, and storage. The storage can be attached using a variety of direct attached or storage networking technologies, including Fibre Channel, iSCSI (Small Computer System Interface over Internet Protocol), VI/IP (Virtual Interface over Internet Protocol), FICON (Fiber Connection), or SCSI (Small Computer System Interface). A bus adapter provides I/O processing capabilities, which reduces processing loads on a central processor in the data processing system to which the bus adapter is attached.

In contrast, a network interface card typically relies heavily on the central processor of a system for protocol processing, including such functions as maintaining packet sequence order, segmentation and re-assembly, error detection and correction, and flow control. A bus adapter manages entire I/O transactions with little or no involvement of the central processor in a system. In the example host bus adapter shown and described in FIG. 4B above, the host bus adapter includes a processor, a protocol controller ASIC, and buffer memory to maintain data flow. This host bus adapter takes block-level data from a parallel I/O channel (e.g., PCI-X) and maps it to a routable protocol (e.g., Fibre Channel).

Figure 5:
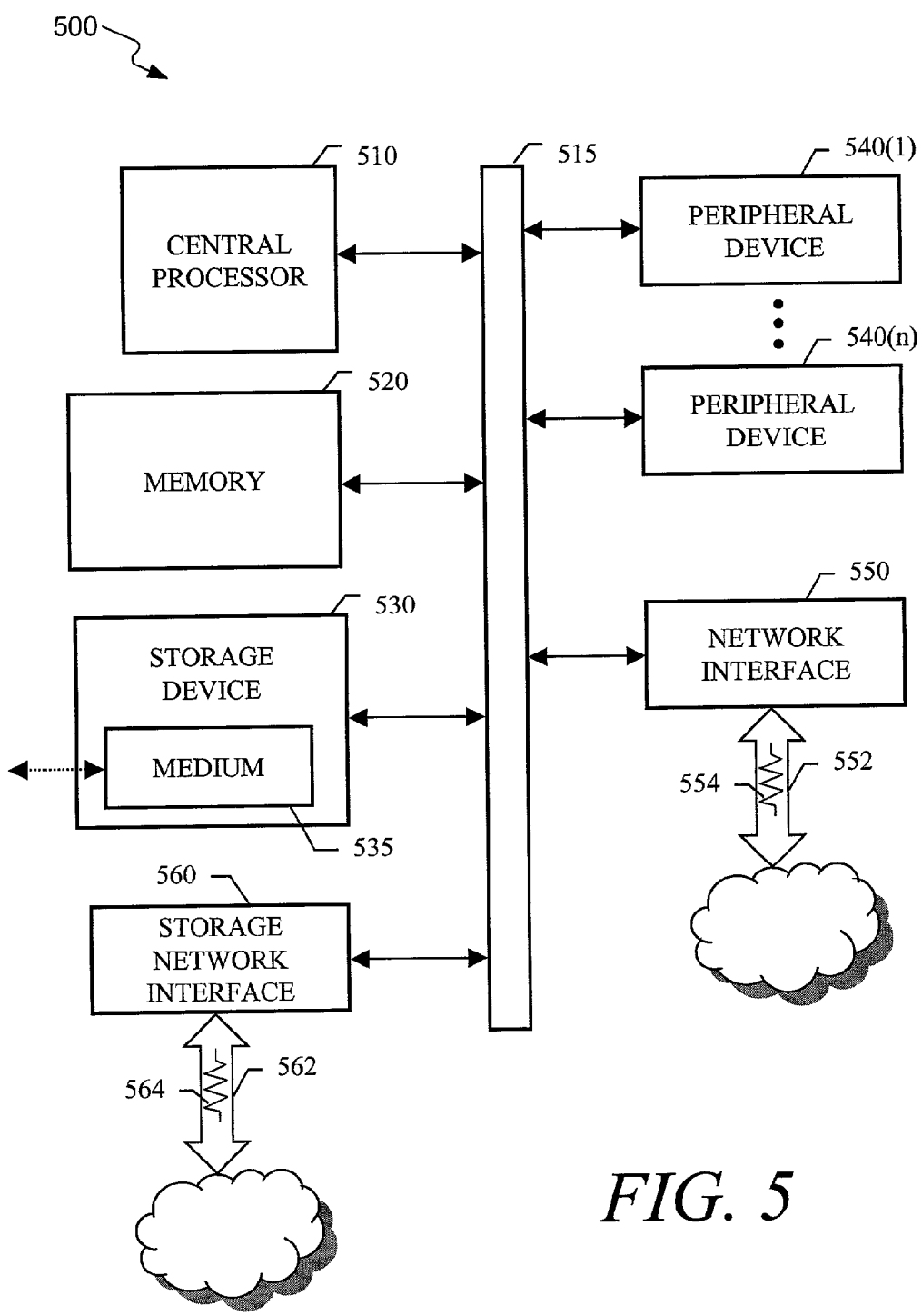
FIG. 5 is a block diagram illustrating an example data processing system.

FIG. 5 is a block diagram illustrating an example data processing system 500. The data processing system 500 includes a central processor 510, which executes programs, performs data manipulations and controls tasks in the system 500. The central processor 510 can include multiple processors or processing units and can be housed in a single chip (e.g., a microprocessor or microcontroller) or in multiple chips using one or more printed circuit boards and/or other inter-processor communication links (i.e., two or more discrete processors making up a multiple processor system).

The central processor 510 is coupled with a system-interconnect bus 515. The system-interconnect bus 515 provides one or more pathways through which data is transmitted among portions of the system 500. The system-interconnect bus 515 can include multiple separate busses, which can be parallel and/or serial busses, bus interfaces, and/or bus bridges. Each bus can have an address bus and a data bus. The system-interconnect bus 515 can include an internal bus to connect internal components to the central processor 510 and memory, and an expansion bus to connect expansion boards and/or peripheral devices to the central processor 510. The system-interconnect bus 515 includes at least one bus architecture that allows data delivery using interleaved multiple concurrent transactions, such as PCI-X, and can further include any other known bus architecture (e.g., PCI, industry standard architecture (ISA), extended ISA (EISA), Accelerated Graphics Port (AGP), Universal Serial Bus (USB), SCSI, future bus architectures).

The data processing system 500 includes a memory 520, which is coupled with the system-interconnect bus 515. The system 500 can also include one or more cache memories. These memory devices enable storage of instructions and data close to the central processor 510 for retrieval and execution.

The memory 520 can include a non-volatile memory and a volatile memory. For example, a non-volatile memory can be used to store system firmware, which can be used to handle initialization of the data processing system 500 and loading of an operating system (OS), such as Windows® NT 4.0 Enterprise Edition, provided by Microsoft Corporation, located at One Microsoft Way Redmond Wash. 98052-6399. The volatile memory, which requires a steady flow of electricity to maintain stored data, can be used to store instructions and data once the system 500 starts up.

The data processing system 500 can include a storage device 530 for accessing a medium 535, which is a machine-readable medium containing machine instructions, such as instructions for causing the system 500 or components of the system 500 to perform operations. The medium 535 can be removable and can include a boot media having OS instructions and data that are loaded into the volatile memory when the system 500 boots up. The medium 535 can be read-only or read/write media and can be magnetic-based, optical-based, semiconductor-based media, or a combination of these. Examples of the storage 530 and the medium 535 include a hard disk drive and hard disk platters, which may be removable, a floppy disk drive and floppy disk, a tape drive and tape, and an optical disc drive and optical disc (e.g., laser disk, compact disc, digital versatile disk).

The data processing system 500 can also include one or more peripheral devices 540(1)–540(n) (collectively, devices 540), and one or more controllers and/or adapters for providing interface functions. The devices 540 can be additional storage devices and media as described above, other storage interfaces and storage units, adaptors, input devices and/or output devices. For example, the system 500 can include a display system having a display device (e.g., a video display adapter having components for driving a display, including video random access memory (VRAM), buffer, and graphics engine).

The system 500 also includes a communication interface 550, which allows software and data to be transferred, in the form of signals 554, between the system 500 and external devices, networks or information sources. The signals 554 can be any signals (e.g., electronic, electromagnetic, optical) capable of being received on a channel 552 (e.g., wire, cable, optical fiber, phone line, infrared (IR) channel, radio frequency (RF) channel, etc.). The signals 554 can embody instructions for causing the system 500 or components of the system 500 to perform operations.

The communication interface 550 can be a communications port, a telephone modem or wireless modem. The communication interface 550 can be a network interface card (e.g., an Ethernet card connected with an Ethernet Hub), and may be designed for a particular type of network, protocol and channel medium, or may be designed to serve multiple networks, protocols and/or channel media.

Additionally, the system 500 includes a storage network interface 560, which allows software and data to be transferred, in the form of signals 564, between the system 500 and a storage area network. The signals 564 can be any signals, such as the signals 554, capable of being transmitted and received on a channel 562. The signals 564 can embody instructions for causing the system 500 or components of the system 500, such as the storage network interface 560, to perform operations. The storage network interface 560 can be a host bus adapter, such as shown and described in connection with FIG. 4B above.

When viewed as a whole, the system 500 is a programmable machine. Example machines represented by the system 500 include a server (e.g., a network host) a personal computer, a mainframe, and a supercomputer. The machine 500 can include various devices such as embedded controllers, Programmable Logic Devices (PLDs) (e.g., PROM (Programmable Read Only Memory), PLA (Programmable Logic Array), GAL/PAL (Generic Array Logic/Programmable Array Logic)), Field Programmable Gate Arrays (FPGAs), ASICs, single-chip computers, smart cards, or the like.

Machine instructions (also known as programs, software, software applications or code) can be stored in the machine 500, in the storage network interface 560, and/or delivered to the machine 500 over a communication interface. These instructions, when executed, enable the machine 500 to perform features and function described above. These instructions represent controllers of the machine 500 and can be implemented in a high-level procedural and/or object-oriented programming language, and/or in assembly/machine language. Such languages may be compiled and/or interpreted languages.

As used herein, the term "machine-readable medium" refers to any computer program product, apparatus and/or device used to provide machine instructions and/or data to the machine 500, including a machine-readable medium that receives the machine instruction as a machine-readable signal. Examples of a machine-readable medium include the medium 535 and the like, the memory 520, and/or PLDs, FPGAs, ASICs, and the like. The term "machine-readable signal" refers to any signal, such as the signals 554, used to provide machine instructions and/or data to the machine 500.

Figure 6:
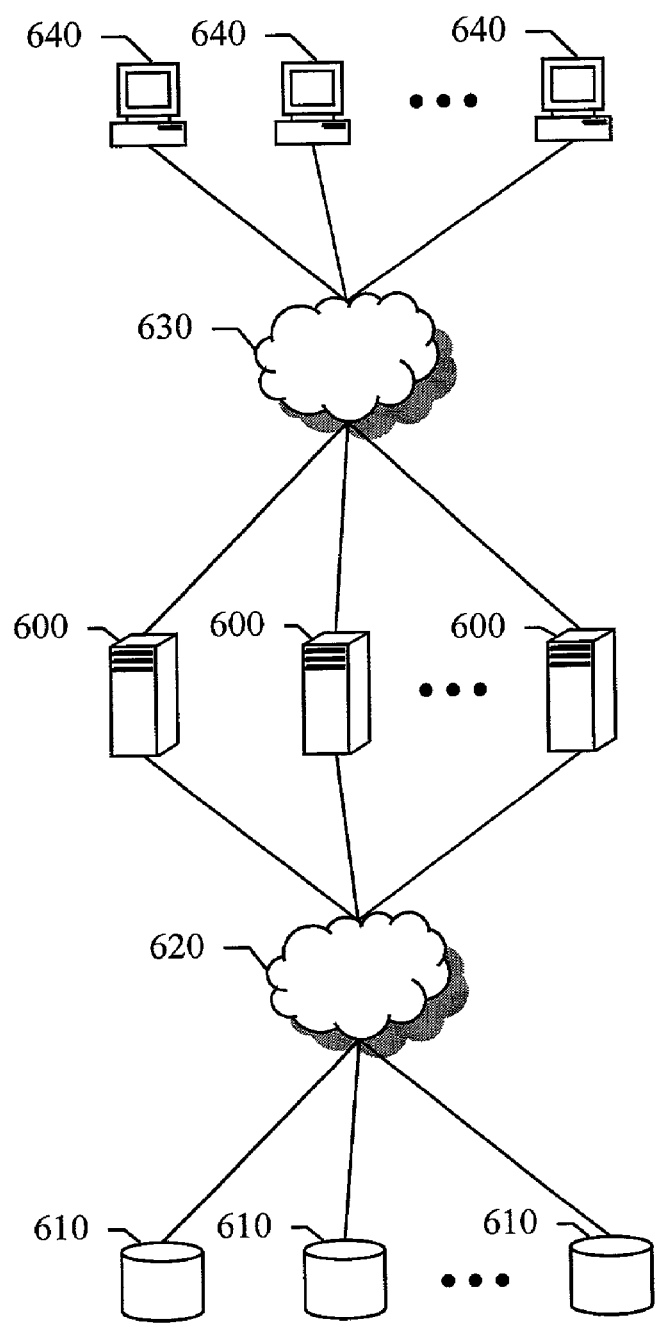
FIG. 6 is a block diagram illustrating an operational environment for a FIFO memory according to one implementation.

FIG. 6 is a block diagram illustrating an operational environment for a FIFO memory according to one implementation. Multiple servers 600 are connected with a storage area network. Each server 600 can be implemented in the manner shown and described above. For example, a server 600 can be an Intel® AC450NX System with four 550-MHz Pentium® III Xeon™ processors and 1 GB (Gigabyte) RAM, or a server 600 can be an Intel® OCPRF100 System with eight 550 MHz Pentium® III Xeon™ processors and 1 GB RAM.

The storage area network includes multiple storage devices 610 and a storage network 620. The storage network 620 can be a high-speed network dedicated to data storage. For example, the storage network 620 can be a Fibre Channel network, such as a Fibre Channel Arbitrated Loop or a Fibre Channel Switched Fabric. Each storage device 610 can be a storage array using SCSI, PCI-X or other bus architecture, JBOD (Just a Bunch of Disks), a RAID (Redundant Array of Inexpensive Disks) enclosure, or other mass storage device. In general, a storage device 610 includes at least one machine-readable medium as defined above, and the storage area network provides block-level I/O access to the shared storage devices 610 for the servers 600.

The servers 600 are connected with a network 630, which can include multiple machine networks, such as Ethernet networks, IP (Internet Protocol) networks and ATM (Asynchronous Transfer Mode) networks. The network 630 can be a private network, a virtual private network, an enterprise network, a public network, and/or the Internet. The network 630 provides a communication link between multiple clients 640 and the servers 600.

Various implementations of the systems and techniques described here can be realized in digital electronic circuitry, integrated circuitry, specially designed ASICs (application specific integrated circuits), computer hardware, firmware, software, and/or combinations thereof. The various implementations described above have been presented by way of example only, and not limitation. Other systems, architectures, and modifications and/or reconfigurations of devices, machines and systems shown are also possible.

Other embodiments may be within the scope of the following claims.

What is claimed is:

1. A method comprising:
    identifying one or more data writing rates for data to be received from interleaved multiple concurrent transactions and written into a FIFO memory having a programmable buffer zone;
    identifying one or more data reading rates for data to be read from the FIFO memory; and
    setting a buffer zone size for the programmable buffer zone of the FIFO memory based upon the identified one or more data writing rates and the one or more data reading rates.

2. The method of claim 1, wherein identifying one or more data writing rates comprises identifying one or more data writing rates for data to be received over a system-interconnect bus.

3. The method of claim 2, wherein setting the buffer zone size comprises setting the buffer zone size to a negative number.

4. The method of claim 3, wherein identifying one or more data reading rates comprises identifying two or more data reading rates.

5. The method of claim 4, wherein the system-interconnect bus comprises a Peripheral Component Interconnect Extended bus.

6. The method of claim 5, wherein said identifying one or more data writing rates and said identifying one or more data reading rates comprises identifying default rates.

7. A first in first out memory comprising:
memory circuitry; and control circuitry coupled with the memory circuitry, the control circuitry including difference circuitry to track available space in the memory circuitry, transfer length input lines to receive memory space requests for multiple data transfers, and a ready output line to indicate whether a sum of the memory space requests exceeds the available space wherein the control circuitry further includes one or more buffer input lines to receive a buffer zone size, and wherein the ready output line indicates whether a sum of the memory space requests and the buffer zone size exceeds the available space.

8. The memory of claim 7, wherein the memory circuitry includes control bits and data bits.

9. The memory of claim 7, further comprising data compression circuitry and data decompression circuitry.

10. The memory of claim 7, wherein the control circuitry further includes a register set to hold the received buffer zone size, wherein the register set includes programmable bit patterns to designate large variations in buffer zone size.

11. The memory of claim 7, wherein the memory circuitry comprises a dual port random access memory.

12. A bus adapter comprising:
a processor;
an adapter memory coupled with the processor;
a bus interface coupled with the adapter memory through a first in first out memory, the bus interface supporting multiple concurrent data transfers;
a storage connection coupled with the adapter memory;
the first in first out memory coupled with the bus interface and with the adapter memory, the first in first out memory comprising memory circuitry, and control circuitry including difference circuitry to track available space in the memory circuitry, transfer length input lines to receive memory space requests for multiple data transfers, one or more buffer input lines to receive a buffer zone size, and a ready output line to indicate whether a sum of the memory space requests and the buffer zone size exceeds the available space; and
management circuitry coupled with the first in first out memory, the management circuitry to provide the memory space requests to the transfer length input lines and coordinate initiation of the multiple data transfers.

13. The bus adapter of claim 12, wherein the memory circuitry includes control bits and data bits to store tags identifying data transactions stored in the memory circuitry.

14. The bus adapter of claim 13, wherein the bus interface conforms to a Peripheral Component Interconnect Extended bus standard.

15. The bus adapter of claim 14, wherein the storage connection comprises a network interface conforming to a Fibre Channel standard.

16. The bus adapter of claim 15, wherein the management circuitry comprises a register block to store memory space requests that are skipped by the first in first out memory.

17. The bus adapter of claim 16, wherein the first in first out memory further comprises data compression circuitry and data decompression circuitry.

18. A system comprising:
a programmable machine including a system-interconnect bus that supports interleaved multiple concurrent transactions;
a storage area network; and
a bus adapter coupled with the system-interconnect bus and the storage area network, the bus adapter comprising a processor, an adapter memory coupled with the processor, a bus interface coupled with the system-interconnect bus and coupled with the adapter memory through a first in first out memory comprising memory circuitry, and control circuitry including difference circuitry to track available space in the memory circuitry, transfer length input lines to receive memory space requests for multiple data transfers, and a ready output line to indicate whether a sum of the memory space requests exceeds the available space wherein the control circuitry further includes one or more buffer input lines to receive a buffer zone size, and wherein the ready output line indicates whether a sum of the memory space requests and the buffer zone size exceeds the available space.

19. The system of claim 18, wherein the memory circuitry includes control bits and data bits to store tags identifying data transactions stored in the memory circuitry.

20. The system of claim 18 wherein the control circuitry further includes a register set to hold the received buffer zone size, wherein the register set includes programmable bit patterns to designate large variations in buffer zone size.

21. The system of claim 18 wherein the system-interconnect bus comprises a Peripheral Component Interconnect Extended bus.

22. The system of claim 18 wherein the storage area network comprises a Fibre Channel network and a plurality of mass storage devices.

* * * * *